(12) United States Patent
Handa (10) Patent No.: US 8,100,151 B2
(45) Date of Patent: Jan. 24, 2012

(54) SHAPED ABSORBENT MEDIA INSTALLED IN A HIGH PRESSURE TANK

(75) Inventor: Kiyoshi Handa, Tochigi (JP)

(73) Assignee: Honda Motor Co. Ltd., Tokyo (JP)

( * ) Notice: Subject to any disclaimer, the term of this patent is extended or adjusted under 35 U.S.C. 154(b) by 1282 days.

(21) Appl. No.: 11/751,318

(22) Filed: May 21, 2007

(65) Prior Publication Data

US 2008/0290645 A1 Nov. 27, 2008

(51) Int. Cl.
*B65B 1/20* (2006.01)
(52) U.S. Cl. ......................................................... 141/82
(58) Field of Classification Search ............. 141/82, 141/98, 286; 222/146.1, 146.6; 62/50.1–50.5
See application file for complete search history.

(56) References Cited

U.S. PATENT DOCUMENTS

| | | | | |
|---|---|---|---|---|
| 5,771,946 A * | 6/1998 | Kooy et al. | | 141/82 |
| 7,377,294 B2 * | 5/2008 | Handa | | 141/82 |
| 7,559,689 B2 * | 7/2009 | Harty | | 374/165 |
| 7,637,292 B2 * | 12/2009 | Handa | | 141/82 |
| 7,681,604 B2 * | 3/2010 | Handa | | 141/82 |
| 7,735,528 B2 * | 6/2010 | Handa | | 141/82 |
| 7,743,797 B2 * | 6/2010 | Handa | | 141/82 |
| 7,757,726 B2 * | 7/2010 | Handa | | 141/82 |
| 7,757,727 B2 * | 7/2010 | Handa | | 141/82 |
| 7,891,386 B2 * | 2/2011 | Handa | | 141/82 |
| 7,938,149 B2 * | 5/2011 | Handa | | 141/82 |
| 7,938,150 B2 * | 5/2011 | Handa | | 141/82 |

* cited by examiner

*Primary Examiner* — Timothy L Maust
(74) *Attorney, Agent, or Firm* — Porter, Wright, Morris & Arthur LLP (57) ABSTRACT

Absorbent media for gas or heat is provided in a predetermined length of a polygon or curvilinear, and preferably honeycomb (hexagonal) cross sectioned shape with gas absorbent media packed therein. The hexagonal tubes may be installed along the radial or longitudinal axis of a fuel tank. The media and/or media tubes are installed during tank manufacture and include defined physical and gas circulation relationships for maintaining extending tubes having a gas absorbent media therein in a predetermined interrelationship with adjacent spaces (which may be tubes) of similar shape that are either open, or filled with a heat absorbent media.

18 Claims, 9 Drawing Sheets

Figure 6A $T_{GAS}$  $T_{SPACE}$

Figure 6B $T_{GAS}$ $T_{SPACE}$

Figure 6C $T_{GAS}$ $T_{SPACE}$

SHAPED ABSORBENT MEDIA INSTALLED IN A HIGH PRESSURE TANK

FIELD OF THE INVENTION

The present invention relates to the installation, within the internal tank volume, of a gas absorbent material useful with on board high pressure compressed natural gas (CNG) and hydrogen fuel tanks installed in motor vehicles and other mobile applications. The installation of the absorbent material in accordance with the invention increases the gas fuel capacity of the tank per unit volume and permits the gas stored within the tank to be cooled during refueling and warmed during driving.

BACKGROUND OF THE INVENTION

A high pressure gaseous fueled vehicle, powered, for example, by engine or fuel cell powered by CNG or hydrogen gas, requires an extended driving range. A gas absorbent installed within the vehicle fuel gas tanks will increase the gas storage amount with respect to a given tank volume. In general, however, the absorbent releases heat during refueling and may need to absorb heat during driving so that gas within the absorbent may be released. In a quick refill of a high pressure tank, heat generated during refueling is considerable when a short time refill is attempted. There is a need for an absorbent media structure for installation within the tank and a corresponding method for installing a gas absorbent media within a high pressure tank—whereby heat transfer to and from the gas within the tank during the various modes of vehicle operation is not compromised and the internal volume of the tank is efficiently packed with absorbent media.

It is an object of the invention to install the absorbent in the tank; to transfer heat from gas filling the absorbent during refill; to transfer (namely, both absorbing and releasing, as required by vehicle mode condition (refill or driving)) heat from the absorbent to the outside of the tank; and to provide an assembly of the media within the tank while accomplishing the foregoing objects.

SUMMARY OF THE INVENTION

In the invention, the heat absorbent media is provided in a predetermined length of a polygon or curvilinear (e.g., circular or elliptical) shape, preferably a honeycomb (hexagonal) cross sectioned media, either formed intrinsically from the media, or provided in a shaped tube with the media packed therein. Although a "tube" is referred to, "tube" as intended herein includes a length of a cylinderlike object or part, whether solid or hollow that includes the absorbent media. Hexagonal tubes may be installed along the radial axis of a fuel tank or aligned longitudinally within the tank included in a plurality of porous laminate discs having a predetermined structure aligned along the center axis of the tank. The media and/or media tubes are installed during tank manufacture and include defined physical relationships for maintaining extending tubes having a gas absorbent media therein in a predetermined interrelationship with adjacent spaces of similar shape that are either open, or filled with a heat absorbent media. Open space within the shaped and packed media assembly allows gas circulation within the tank even though essentially the entire interior volume of the tank is occupied by the honeycomb assembly, except for side tolerances and a central heat exchanger. The invention is described more fully in the following description of the preferred embodiment considered in view of the drawings in which:

BRIEF DESCRIPTION OF THE SEVERAL VIEWS OF THE DRAWINGS

FIG. 2B is a radial cross section through the center of the tank of FIG. 2A showing the respective alignments of absorbent media tubes and spacer (or heat absorbent) tubes within a fuel tank. FIG. 2B also includes arrow ended lines showing the circulation of gas within the tank from HOT (within the tank tubes) to COOL (to the central heat exchanger).

DETAILED DESCRIPTION OF THE INVENTION

In the invention, absorbent media for gas or heat is provided in a predetermined length of a polygon or curvilinear, and preferably honeycomb (hexagonal) cross sectioned shape with gas absorbent media packed therein. A honeycomb assembly of adjacent tubes is provided, essentially corresponding in an assembly to match the interior volume of the tank. The tubes may be installed along the radial or longitudinal axis of a fuel tank. The media and/or media tubes are installed during tank manufacture and include defined physical and gas circulation relationships for maintaining extending tubes having a gas absorbent media therein in a predetermined interrelationship with adjacent spaces (which may be tubes) of similar shape that are either open, or filled with a heat absorbent media. Although "tubes" are referred to, the intent of the reference to tubes is also to include solid shaped absorbent media and spacers and preferably in a preferred example, a honeycomb hexagonal tube structure. Adjacent hexagonal tubes may be aligned adjacent each other without essentially any wasted space between the interstices.

The invention provides a vehicle tank for the storage of high pressure gas. A plurality of longitudinally extending tubes with gas absorbent media are packed in the tank in an ordered arrangement extending along an axis of the tank. A plurality of spaces for gas flow are adjacent the longitudinally extending tubes with the gas absorbent media packed therein and an internal heat exchanger is centrally located within the high pressure tank, such that the heat exchanger is surrounded by the tubes. The tank is configured with the vehicle gas flow system. A conduit circuit defines a pattern whereby gas is circulated in directions depending on the operational mode of the vehicle on which the tank is installed. First, in a refill mode, gas from a refuel depot is introduced into the internal heat exchanger for circulation therein and exits into an external heat exchanger where the gas is cooled before the gas enters the tank for storage. Second, in a driving mode, gas is exhausted from the tank through the conduit circuit into the external heat exchanger where gas is warmed and is then introduced into the internal heat exchanger to warm the absorbent media and the gas otherwise stored in the tank before the gas is conveyed in the circuit to the vehicle operation system.

In embodiments, the internal heat exchanger is centrally positioned within the tank along the lengthwise axis of the tank and the tubes are disposed perpendicularly with respect to heat exchanger such that the tubes essentially fill the volume of the tank and surround the volume occupied in the tank by the heat exchanger, or the internal heat exchanger is centrally positioned within the tank along the lengthwise axis of the tank and the tubes are disposed along the lengthwise axis of the tank such that the tubes essentially fill the volume of the tank and surround the volume occupied in the tank by the heat exchanger.

In another example, a vehicle tank includes a plurality of donut shaped laminated disks. Each disk comprises an upper and a lower gas permeable support between which an arrangement of extending tubes having a gas absorbent media packed therein is disposed; the tubes are ordered in an arrangement with respect to gas flow spaces between the upper and the lower support for the disks and the disks are spaced apart within the tank along the lengthwise axis of the tank. In the multiple disk example, an internal heat exchanger is centrally located within the center opening of the donut shaped disk and the heat exchanger extends along the lengthwise axis of the tank, disposed within the tank such that the heat exchanger is surrounded by the disks. As in the previous example, a conduit circuit defines a gas flow pattern whereby gas is circulated depending on the operational mode of the vehicle: i) in a refill mode, gas from a refuel depot is introduced into the internal heat exchanger for circulation therein and exits into an external heat exchanger where the gas is cooled before the gas enters the tank for storage; or ii) in a driving mode, gas is exhausted from the tank through the conduit circuit into the external heat exchanger where gas is warmed and is then introduced into the internal heat exchanger to warm the absorbent media and the gas otherwise stored in the tank before the gas is conveyed in the circuit to the vehicle operation system.

In a preferred embodiment, tubes are commercially available in a hexagonal/honeycomb arrangement; however, the cross section of the extending tubes may be a polygon or a curvilinear shape. The media within the tubes may be an absorbent media for compressed natural gas or hydrogen gas.

The invention increases the effective range of high pressure gas powered vehicles by storing additional gas within the absorbent media and releasing the gas when needed by heating the residual gas remaining in the tank interior volume. In the invention, a heating/cooling circuit is disposed inter operatively with the on board vehicle tank. During refill, refill gas circulates through an in situ on board tank heat exchanger HEX 1. Heat absorbed in HEX 1 during refill is conveyed by the circulating refueling gas to a second heat exchanger, HEX 2, exterior to the tank, where the absorbed heat is eliminated by an ambient temperature heat exchange or other cooling device. During driving, heat transfer in the system is reversed, and, when needed, heat is transferred to internal HEX 1 from external HEX 2 to release and expand the gas absorbed in the media during the refill process.

Figure 1:
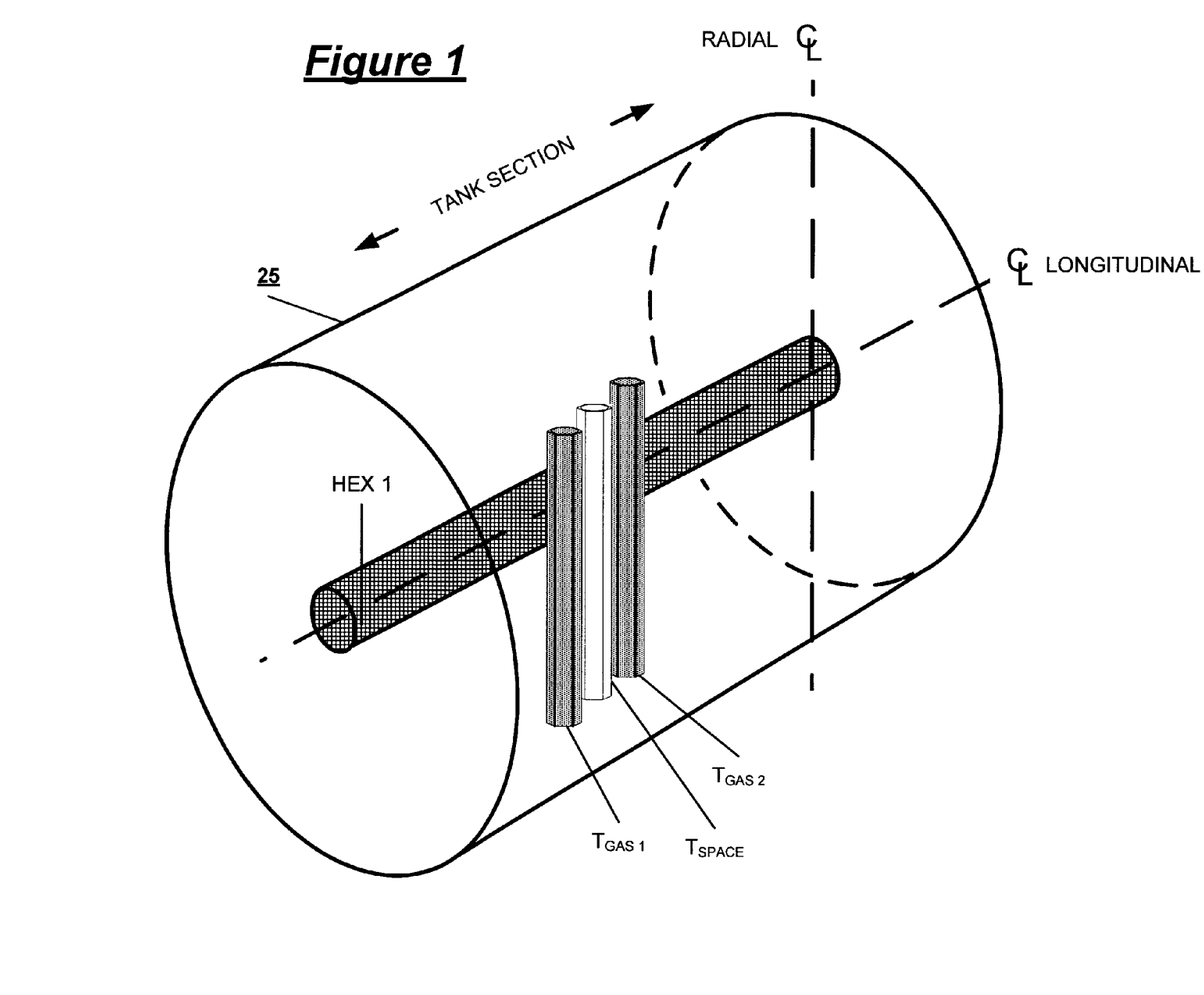
FIG. 1 shows a section of a high pressure gas fuel tank and gas absorbent media tubes and open space tubes aligned radially within the fuel tank.

A section of a fuel tank 25 is shown in FIG. 1 with internal HEX 1 extending along the length of the tank and centrally positioned therein. A multiplicity of gas absorbent media tubes $T_{GAS\ 1}$ and $T_{GAS\ 2}$ and spacer tubes $T_{SPACE}$ are positioned radially in the tank. The respective radial and longitudinal center line ₵ axes the tank are also shown in FIG. 1. In an example for use of the invention with hydrogen gas, the absorbent tubes $T_{GAS\ 1}$, $T_{GAS\ 2}$, $T_{GAS}$ . . . , and $T_{GAS\ N}$ are typically filled with a metal organic framework, metal hydrate, carbon nano tubes, ion complexes and the like. For CMG applications, a typical absorbent is activated carbon. A typical tank volume for automotive use is approximately 167 L.

Figure 2A:
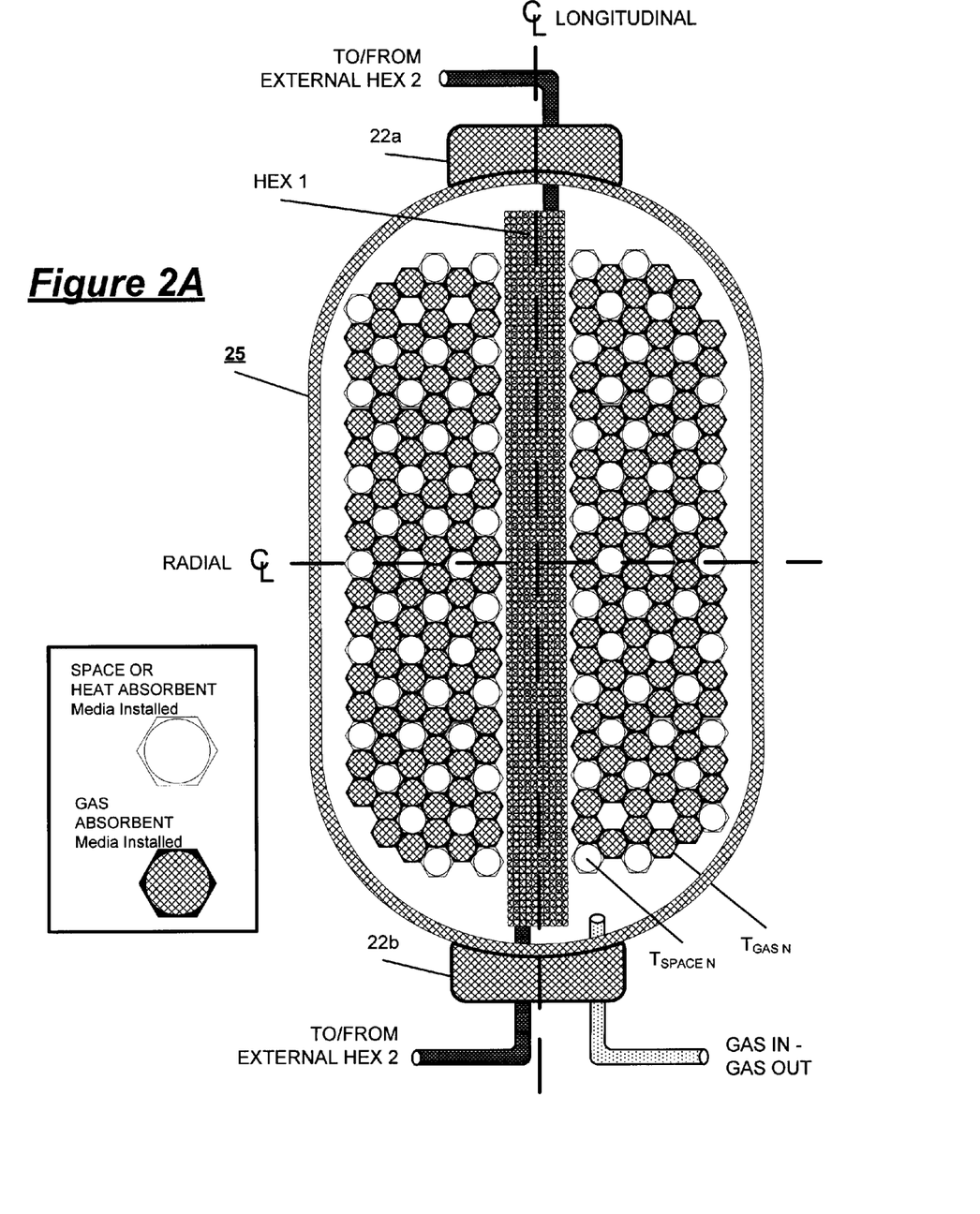
FIG. 2A shows a longitudinal cross section of a tank interior configured with gas absorbent media tubes and spacer tubes.
Figure 2B:
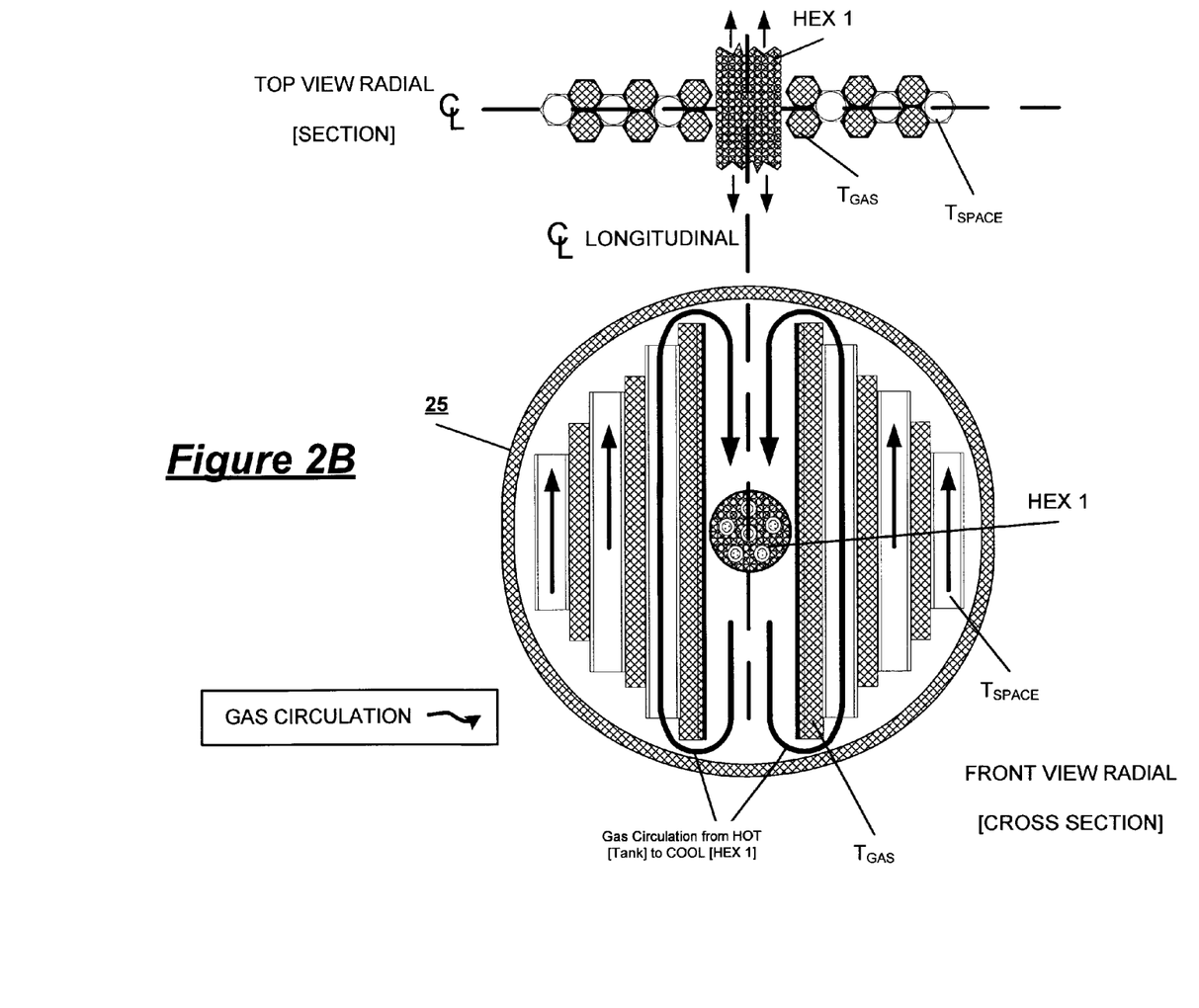
Figure 2C:
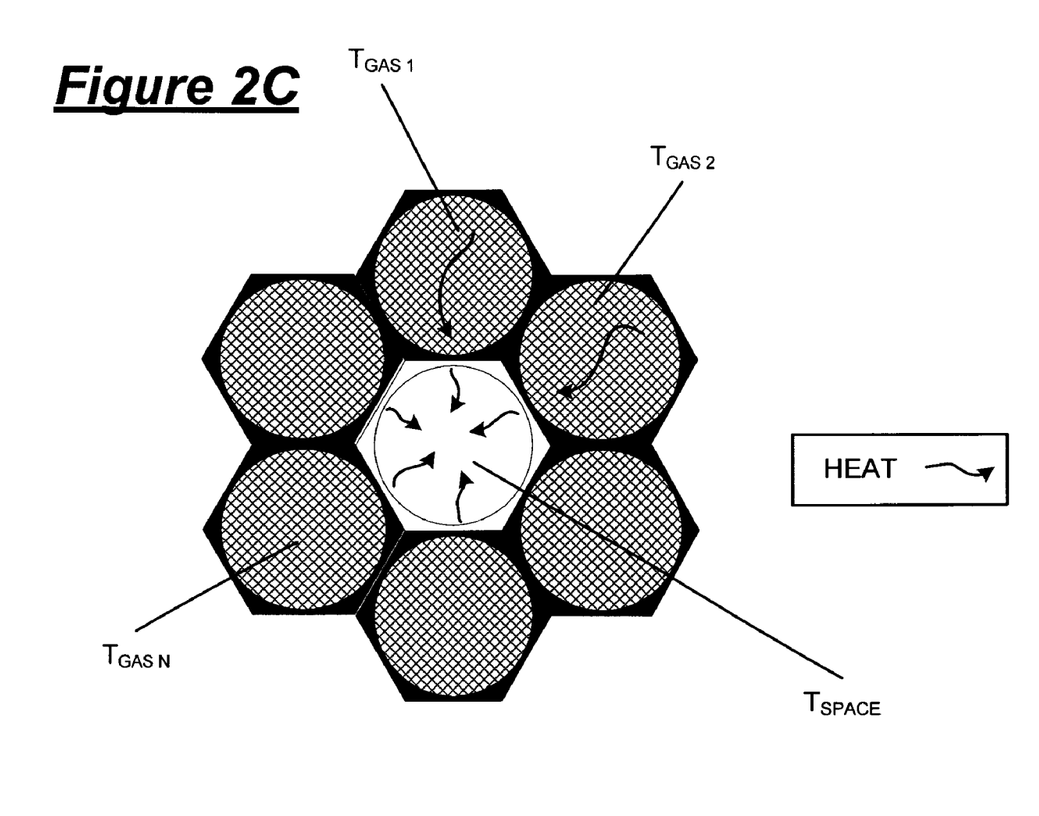
FIG. 2C is a plan view showing the relationships of the hexagonal gas absorbent tubes and the spacer tubes, and heat flow therein.

A longitudinal center cross section of a tank interior configured with a full complement of gas absorbent media tubes $T_{GAS\ N}$ and spacer tubes $T_{SPACE\ N}$ (as described by the drawing legend) is shown in FIG. 2A. The fuel tank includes bosses 22a and 22b at either end thereof allowing for the installation of conduit for HEX media flow and gas entry and exhaustion from the tank. FIG. 2B is a radial cross section through the center of the tank of FIG. 2A showing the respective alignments of the $T_{GAS}$ and spacer $T_{SPACER}$ tubes within the fuel tank with gas circulation flow from HOT to COOL shown by the arrow lines therein. Preferably, the honeycomb structure is one piece having an empty center area which works as the structural support for a heat exchanger. FIG. 2C is a plan view showing one example of a relationship of the hexagonal gas absorbent tubes and the spacer or heat absorbent tubes. Heat flow from and to the absorbent media elements and the spacer or heat absorbent media elements is shown by the solid arrow lines therein.

Figure 3A:
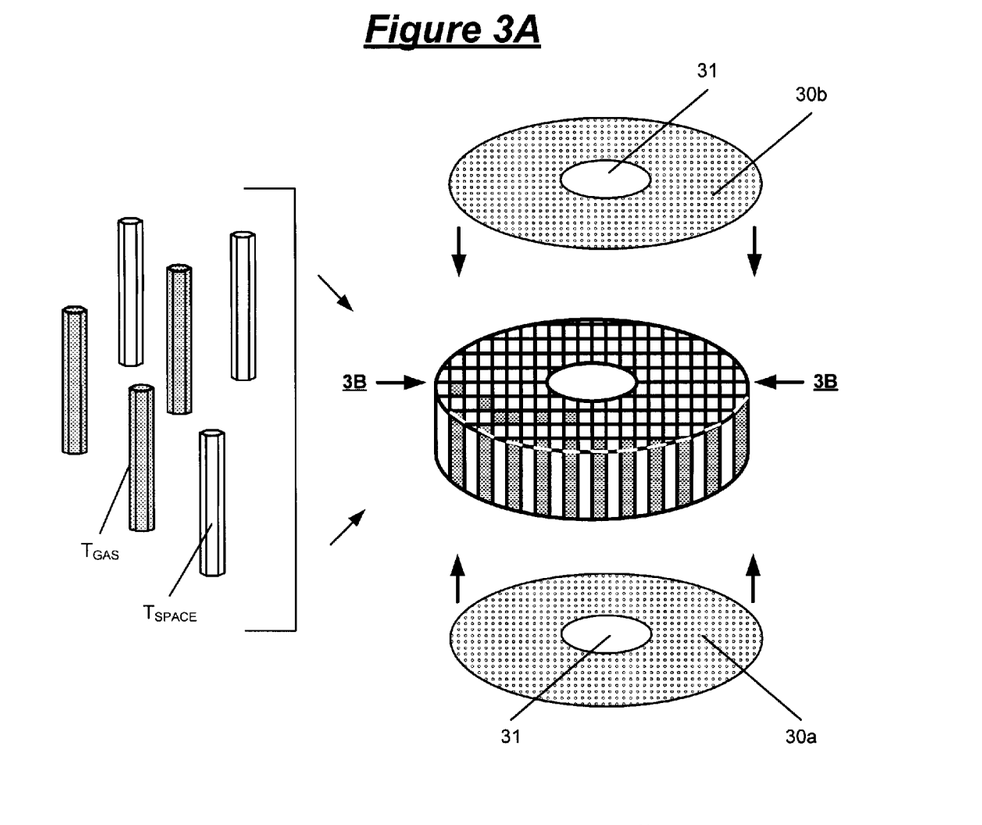
FIG. 3A an assembly view of gas and spacer elements formed into a laminate segment for installation along the longitudinal axis of the tank.
Figure 3B:
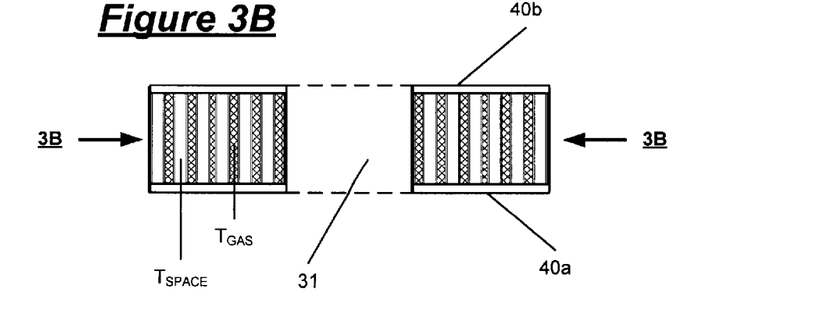
FIG. 3B is a side cross section view of a tank showing a tank fully packed with the laminate segments illustrated in FIG. 3A with a center internal heat exchanger (HEX) installed therein interconnected with an external HEX.

FIG. 3A illustrates the assembly of gas absorbent and spacer elements formed into a circular laminate disc or foreshortened cylinder for installation along the longitudinal axis of the tank. The shaped $T_{GAS}$ and $T_{SPACER}$ elements are assembled as the central section of a laminate in a predetermined configuration pattern adjacent each other (See, for example, FIG. 4A, FIG. 4B and FIG. 4C.) and are enclosed at their tops and bottoms by porous (gas permeable) plates shown as 30a and 30b having a central opening therein 31 for passage therethrough of the internal HEX 1. The plates 30a and 30b are essentially identical, having a circumferential shape corresponding to a diameter less than the tank cross section diameter. The assembly is smaller in diameter than the inside diameter of the tank to allow a radial tolerance between the internal tank wall and the outside radius of the divider. Preferably, the top and bottom plates may include raised edges or rims, 40a and 40b shown in FIG. 3B, facing inward toward each other for maintaining the hexagonal media elements, $T_{GAS}$ and $T_{SPACER}$, in a fixed positional relationship with one another in the laminated disc/cylinder formed thereby. FIG. 3B is a side cross section view of a laminate assembly showing a disc fully packed with the media and spacer segments.

Figure 3C:
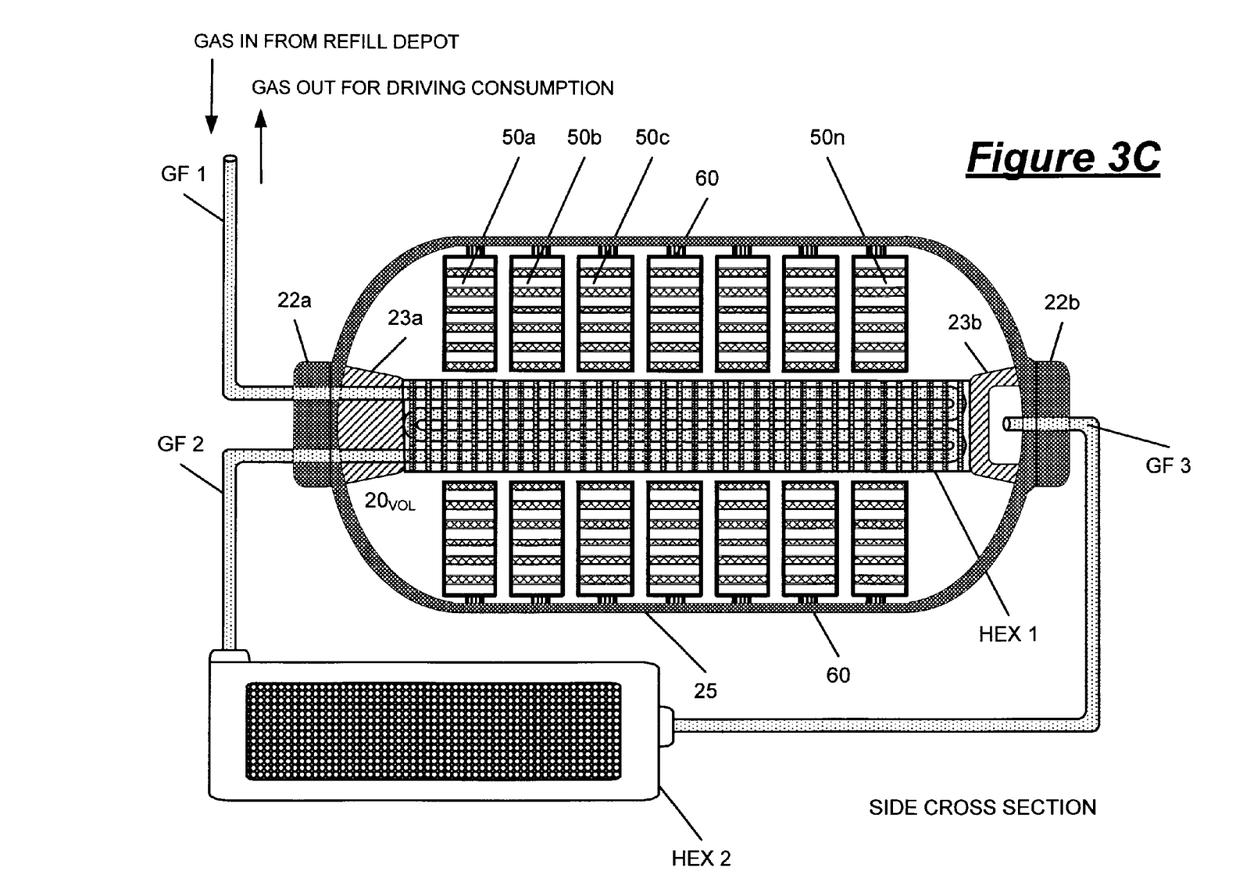
FIG. 3C is a longitudinal cross section of a fully configured system in accordance with the invention.

FIG. 3C is a longitudinal side cross section along the center diameter of a fully configured tank system in accordance with the invention showing tank 25 with end bosses 22a and 22b. In the example of FIG. 3C, internal HEX 1, supported by internal fittings 23a and 23b, is interconnected with external HEX 2 through gas flow conduits GF 1 for gas fill. During refill, $H_2$ gas circulates through HEX 1 to absorb heat and the gas leaves GF 2 to external HEX 2 where the gas is cooled; then the cooled gas is introduced through GF 3 and flows through HEX 2, where the gas is warmed, and in turn circulates within HEX 1 to heat the tank interior gas and release the gas formerly captured in the absorbent during refill. Thus gas may flow in either direction through HEX 1 and HEX 2 depending on whether cooling or heating is required during a particular mode of vehicle operation. As described in FIG. 3C, the tank 25 interior volume $20_{VOL}$ includes a plurality of laminated assemblies of absorbent and spacer hexagons formed into the plurality of discs, 50a, 50b, 50c . . . 50n, installed in the tank. The laminated discs are supported within the tank interior by braces or spacers shown at 60 affixed at various positions on the side edges of the discs. HEX 1 and the conduits for gas flow GF1, GF2 and GF3 passing through the tank bosses 22a and 22b are also shown in FIG. 3C.

I am the inventor of numerous configurations of refill, heating and cooling systems utilized in high pressure gas tank applications to which the present system is applicable. See, for example, my applications published to date: 1) Pressure Differential System for Controlling High Pressure Refill Gas Flow Into on Board Vehicle Fuel Tanks, application Ser. No. 11/468,160 filed Aug. 29, 2006; Publication Number 2007-0051423 published Mar. 8, 2007; 2) Gas Cooling Method Using a Melting/Solidifying Media for High Pressure Storage Tanks for Compressed Natural Gas or Hydrogen, application Ser. No. 11/381,005 filed May 1, 2006; Publication No. 2007-0000563 published Jan. 4, 2007; 3) System for Enhancing The Refill Capacity of High Pressure Storage Tanks for Compressed Natural Gas or Hydrogen, application Ser. No. 11/380,996 filed May 1, 2007; Publication No. 2007-0000562 published Jan. 4, 2007; 4) Pressure Powered Cooling System for Enhancing the Refill Speed and Capacity of On Board High Pressure Vehicle Gas Storage Tanks, application Ser. No. 11/380,429 filed Apr. 26, 2006; Publication No. 2007-0000561 published Jan. 4, 2007; 5) Gas Cooling Methods for High Pressure Storage Cylinder Fuel Tanks on Vehicles Powered by Compressed Natural Gas or Hydrogen, application Ser. No. 11/279,574 filed Apr. 13, 2006; Publication No. 2007-0000016 published Jan. 4, 2007.

Figure 5A:
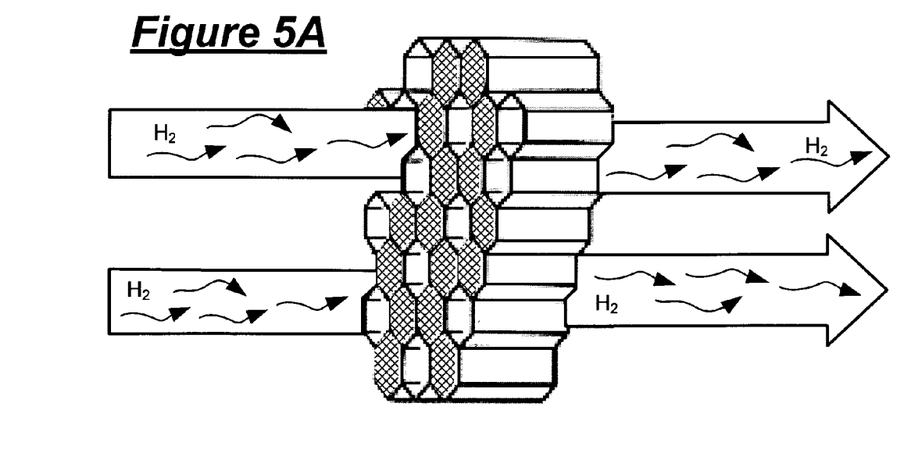
FIG. 5A and FIG. 5B respectively illustrate hydrogen and CNG gas flow through a typical honeycomb assembly installed within a tank.
Figure 5B:
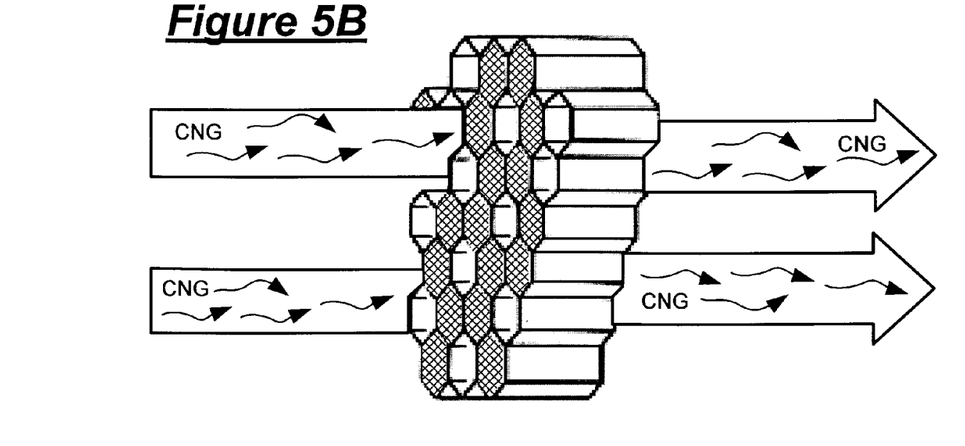

Configurations of the absorbent media hexagons and spaces, or heat absorbent media hexagons, in accordance with the invention may be configured in accordance with the gas absorbent capacity of a particular media, the quantity of gas desired to be stored and various volume relationships of the gas absorbent media and heat absorbent media and the cross sectional area and length of the media cells. In the example of hexagons, honeycomb cell panels are commercially provided by numerous suppliers. At the reference site for a general industry honeycomb product of Yokohama Rubber Co., Ltd. (Japan), the following chart of Table 1 appears. The honeycomb units are provided in aluminum foil, gold and corrosion resistant variations. The cell size defined is the opposite side distance of the three opposing sides of a hexagon. Gas flow through a honeycomb assembly is shown in FIG. 5, also provided at a reference site of Yokohama Rubber Co., Ltd. (Japan).

TABLE 1

| Cell size | in | ⅛ | 3/16 | ¼ | ⅜ | ¾ |
|---|---|---|---|---|---|---|
| | mm | 3.18 | 4.76 | 6.35 | 9.53 | 19.1 |
| Thickness of foil | in | 0.0010 | 0.0020 | 0.0020 | 0.0020 | 0.0020 |
| | mm | 0.025 | 0.051 | 0.051 | 0.051 | 0.051 |
| Density | g/cm³ | 0.0528 | 0.0736 | 0.0544 | 0.0384 | 0.0192 |

In the honeycomb panel, because the honeycomb cells are divided finely by the thin cell wall of the honeycomb core, air convection is generally prevented between adjacent cells. The open air capacity of a honeycomb unit is approximately 95~99% per unit volume of weight compared with the weight ratio of the material forming the core of the honeycomb structure, 5~1% (Yokohama Rubber Co., Ltd. (Japan)). An example of H2 storage capacity per unit volume of an aluminum honeycomb section is calculated as follows: 100 L (H2)× 0.0192 kg/L=1.92 kg; 1.92 kg÷2.7 kg/L=0.71 L+α, where t=50 μm ⑤.). In the equation, 2.7 kg/L is the density of aluminum; 0.71 L is the dead volume occupied by aluminum; the cell with absorbent has a 50 micron thickness. Adhesive used in fabricating the honeycomb has small dead volume (α), alfa, as well. From this estimation, the honeycomb structure consumes little volume in the tank; hence overall storage capacity is not essentially affected by inclusion of the honeycomb structure.

Figure 4A:
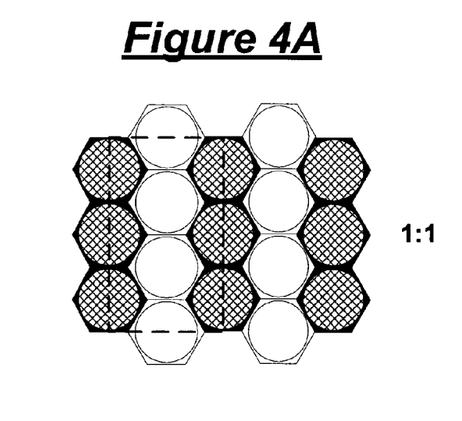
FIG. 4A, FIG. 4B and FIG. 4C show examples of gas absorbent tubes in predetermined area relationships with spacer or heat absorbent tubes useful in configuring assemblies in accordance with the invention.
Figure 4B:
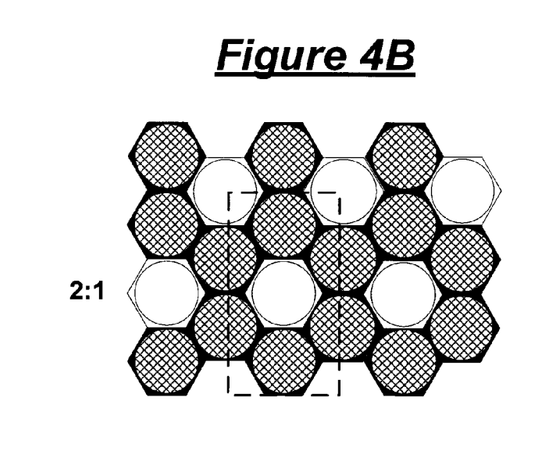
Figure 4C:
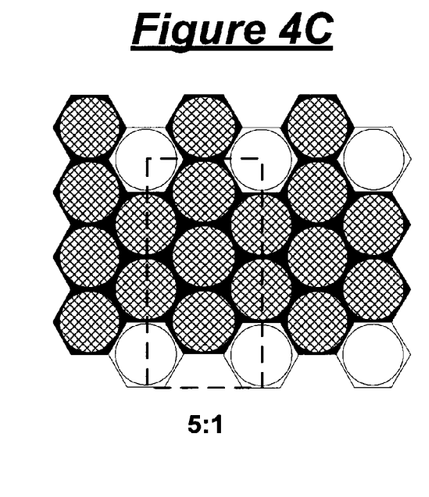

FIG. 4A, FIG. 4B and FIG. 4C show examples of gas absorbent tubes in predetermined area relationships, 1:1 (FIG. 4A), 2:1 (FIG. 4B) and 5:1 (FIG. 4C), between the spacer or heat absorbent media sections, useful in configuring absorber/spacer assemblies in accordance with the invention.

Figure 6A:
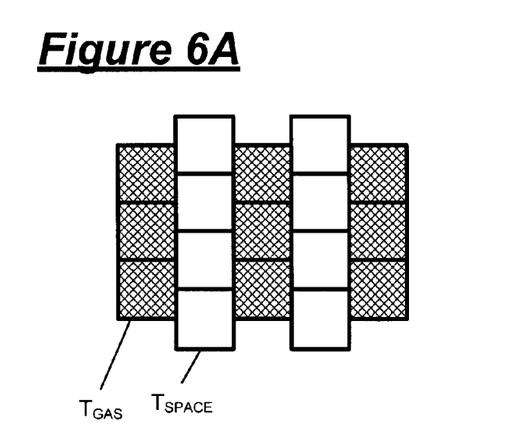
FIG. 6A, FIG. 6B, and FIG. 6C respectively show examples of rectangular, triangular and circular gas absorbent tubes in predetermined area relationships with spacer cavities or heat absorbent tubes also useful in the invention.
Figure 6B:
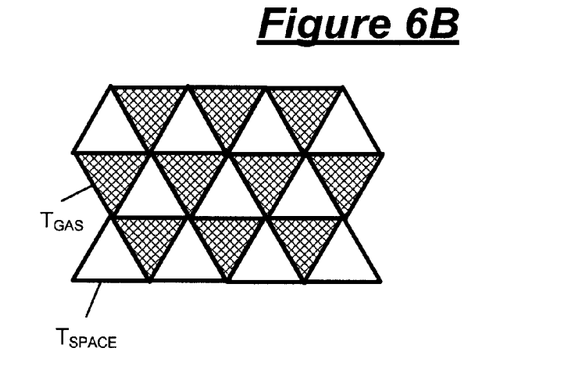
Figure 6C:
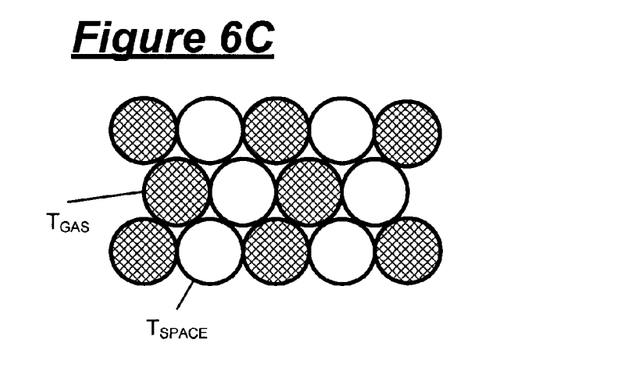

In an assembly, hydrogen gas, $H_2$, will migrate through the length of the tubes. Gas circulation is permitted in the tank and in the absorbent tubes and spacer openings or the heat absorbent tubes. As shown in FIG. 2C, heat migrates by conduction sideways through the cell walls to adjacent cells; gas otherwise flows through the cell length as shown in FIG. 5 and heat transfer from and to the absorbent occurs by convection. The cell tubes are packed in a prearranged order with an absorbent media such as pellets, particulate or granular matter; or the media may itself be shaped into solid permeable lengths of media for installation. While hexagonal tubes are shown, tubes may have cross section shapes such as curvilinear (circular, elliptical) or various polyhedron shapes such as shown in FIG. 6A, FIG. 6B and FIG. 6C. The open spaces adjacent the shaped media may include a tube complementary with the shaped media, i.e., of the same shape, packed with a heat absorbent material such as a water, naphthalene or glycol composition. The absorbent media tubes and spacers are fabricated within the tank during tank construction. As noted, a high pressure storage tank is typically formed of reinforced fiber composite for high pressure mobile gas storage applications and will typically include one or more end piece or boss at the end(s) thereof.

Depending on design considerations for gas flow, an openable boss may be included at one or both ends allowing access to the tank interior and will include conduits therein to allow gas flow, or coolant flow, into and out of the tank.

Having described the invention in detail, those skilled in the art will appreciate that, given the present description, modifications may be made to the invention without departing from the spirit of the inventive concept herein described. Therefore, it is not intended that the scope of the invention be limited to the specific and preferred embodiments illustrated and described. Rather, it is intended that the scope of the invention be determined by the appended claims.

The invention claimed is:

1. Storage tank apparatus for high pressure fuel gas including:
   a) a plurality of tubes or rods comprising either a gas absorbent media or heat absorbent media, the tubes or rods being in an ordered side by side arrangement extending along a longitudinal axis of the tank;
   b) a plurality of spaces for gas flow adjacent to the tubes or rods;

c) a heat exchanger centrally disposed internally within the tank such that the heat exchanger is surrounded by the tubes or rods;
d) a heat exchanger external to the tank;
e) a gas flow circuit defining gas flow into, through and from the tank, the internal heat exchanger, and the external heat exchanger, wherein gas is circulated depending on the operational mode of the vehicle on which the tank is installed such that, in a refill mode, gas from a refuel depot introduced into the internal heat exchanger for circulation therein and flows into the external heat exchanger where heat absorbed from gas in the tank is exhausted before the gas enters the tank for storage, and, in a driving mode, before the gas is conveyed to the vehicle power plant, the gas flows from the tank in the flow circuit into the external heat exchanger where the gas is warmed and then introduced into the internal heat exchanger whereby the gas otherwise stored in the tank is warmed.

2. The tank of claim 1 wherein the internal heat exchanger is centrally positioned within the tank along the lengthwise axis of the tank and the tubes or rods are disposed perpendicularly with respect to the heat exchanger such that the tubes or rods occupy a portion of the volume of the tank and surround the volume of the tank occupied by the heat exchanger in the tank.

3. The tank of claim 1 wherein the internal heat exchanger is centrally positioned within the tank along the lengthwise axis of the tank and the tubes or rods are disposed along the lengthwise axis of the tank such that the tubes or rods essentially fill the volume of the tank and surround the volume occupied in the tank by the heat exchanger.

4. Storage tank apparatus for the refueling and exhaustion of high pressure fuel gas in an on board vehicle fuel tank including:
a) a plurality of donut shaped laminated disks arranged in a sequential assembly, the disk assembly comprising a pair of gas permeable support plates between which an arrangement of separate extending tubes or rods comprising either a gas absorbent media or heat absorbent media is disposed, the tubes or rods being coaxially arranged with respect to the upper pair of support plates for the assembly, the plurality of disk assemblies being spaced apart within the tank along the lengthwise axis thereof;
b) an internal heat exchanger centrally located within the center opening of the donut shaped disks, the heat exchanger extending along the lengthwise axis of the tank and being disposed within the tank such that the heat exchanger is concentrically surrounded by the disks;
c) a heat exchanger external to the tank;
d) a gas flow circuit defining gas flow into, through and from the tank, the internal heat exchanger, and the external heat exchanger, wherein gas is circulated depending on the operational mode of the vehicle on which the tank is installed such that, in a refill mode, gas from a refuel depot introduced into the internal heat exchanger for circulation therein flows into the external heat exchanger where heat absorbed from the gas in the tank is exhausted before the gas enters the tank for storage, and, in a driving mode, before gas in the tank is conveyed to the vehicle power plant, the gas flows from the tank in the flow circuit into the external heat exchanger where gas is warmed and then introduced into the internal heat exchanger whereby the gas otherwise stored in the tank is warmed.

5. The tank of claim 1 or claim 4 wherein the cross section of the extending tubes or rods is one of a polygon and a closed curvilinear shape.

6. The tank of claim 1 or claim 4 wherein the cross section of the extending tubes or rods is hexagonal in shape.

7. The tank of claim 1 or claim 4 wherein a proportion of the tubes or rods is filled with an absorbent media for compressed natural gas.

8. The tank of claim 1 or claim 4 wherein a proportion of the tubes or rods is filled with an absorbent media for hydrogen gas.

9. The tank of claim 1 or claim 4 wherein a proportion of the tubes or rods is filled with a heat exchange media.

10. The tank of claim 8 wherein the tubes or rods comprise a metal organic framework, metal hydrate, carbon nano tubes, ion complex or activated carbon.

11. The tank of claim 9 wherein the tubes or rods include a water, naphthalene or a glycol composition filling.

12. The tank of claim 1 or claim 4 wherein open spaces are provided within the vehicle tank in an arrangement complementary with the tubes or rods filled with a heat absorbent material.

13. Storage tank apparatus for high pressure fuel gas including:
a) a plurality of tubes or rods comprising either a gas absorbent media or heat absorbent media, the tubes or rods being in an ordered side by side arrangement extending transversely along a longitudinal axis of the tank;
b) a plurality of spaces for gas flow adjacent to the tubes or rods;
c) a heat exchanger centrally disposed internally within the tank such that the heat exchanger is surrounded by the tubes or rods;
d) a heat exchanger external to the tank;
e) a gas flow circuit defining gas flow into, through and from the tank, the internal heat exchanger, and the external heat exchanger, wherein gas is circulated depending on the operational mode of the vehicle on which the tank is installed such that, in a refill mode, gas from a refuel depot introduced into the internal heat exchanger for circulation therein and flows into the external heat exchanger where heat absorbed from gas in the tank is exhausted before the gas enters the tank for storage, and, in a driving mode, before the gas is conveyed to the vehicle power plant, the gas flows from the tank in the flow circuit into the external heat exchanger where the gas is warmed and then introduced into the internal heat exchanger whereby the gas otherwise stored in the tank is warmed.

14. The tank of claim 1 or claim 4 or claim 13 wherein the tubes or rods extending in the tank have a cross-section that is a polyhedron in shape.

15. The tank of claim 14 wherein the polyhedron tubes or polyhedron rods extending in the tank have a cross-section that is a in triangular, square or hexagon shape.

16. The tank of claim 1 or claim 4 or claim 13 wherein the tubes or rods extending in the tank have a cross-section that is circular in shape.

17. The tank of claim 1 or claim 4 or claim 13 wherein the internal volume of the tank is essentially occupied by tubes or rods and spaces and the tank includes a central, longitudinally extending cavity within which the internal heat exchanger is disposed.

18. The tank of claim 13 wherein the plurality of spaces for gas flow adjacent to the tubes or rods within the vehicle tank include a rod or a tube complementary in shape with the rods or tubes filled with a heat absorbent material.

* * * * *